US012140810B2

(12) United States Patent
Patra et al.

(10) Patent No.: US 12,140,810 B2
(45) Date of Patent: Nov. 12, 2024

(54) APPARATUS AND METHOD FOR HYBRID OPTO-ELECTRICAL MULTICHIP MODULE

(71) Applicant: Lawrence Livermore National Security, LLC, Livermore, CA (US)

(72) Inventors: Susant K. Patra, Brentwood, CA (US); Razi-Ul Muhammad Haque, San Francisco, CA (US); Komal Kampasi, San Francisco, CA (US); Ian Seth Ladner, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/587,591

(22) Filed: Jan. 28, 2022

(65) Prior Publication Data
US 2022/0221670 A1 Jul. 14, 2022

Related U.S. Application Data

(62) Division of application No. 16/707,764, filed on Dec. 9, 2019, now Pat. No. 11,262,514.

(51) Int. Cl.
*G02B 6/42* (2006.01)
(52) U.S. Cl.
CPC ........... *G02B 6/4291* (2013.01); *G02B 6/421* (2013.01); *G02B 6/4278* (2013.01)
(58) Field of Classification Search
None
See application file for complete search history.

(56) References Cited

U.S. PATENT DOCUMENTS

| 6,693,736 | B1 | 2/2004 | Yoshimura et al. | |
|---|---|---|---|---|
| 2002/0028045 | A1 | 3/2002 | Yoshimura et al. | |
| 2004/0056596 | A1 | 3/2004 | Iguchi et al. | |
| 2004/0258359 | A1* | 12/2004 | Corkum | G02B 6/24 385/39 |
| 2014/0061452 | A1* | 3/2014 | Schade | G01D 5/35383 438/69 |
| 2018/0017748 | A1* | 1/2018 | Mir Shafiei | G02B 6/43 |
| 2018/0024292 | A1* | 1/2018 | Beausoleil | G02B 6/30 385/14 |
| 2018/0246279 | A1* | 8/2018 | Florian Lohse | G02B 6/3839 |
| 2018/0306976 | A1* | 10/2018 | Mir Shafiei | G02B 6/2934 |
| 2019/0154931 | A1* | 5/2019 | Masters | G02B 6/4227 |
| 2019/0265415 | A1* | 8/2019 | Psaila | G02B 6/12002 |
| 2020/0110215 | A1* | 4/2020 | Mouskeftaras | G04B 19/305 |

FOREIGN PATENT DOCUMENTS

WO  WO-0115819 A1 *  3/2001  ............. B22D 19/00

* cited by examiner

*Primary Examiner* — Chad H Smith
(74) *Attorney, Agent, or Firm* — HARNESS, DICKEY & PIERCE, P.L.C.

(57) ABSTRACT

The present disclosure relates to a monolithic waveguide substrate for enabling routing of at least one optical signal. The monolithic waveguide substrate has a monolithic engineered substrate having a uniform material composition throughout, with a first index of refraction, and with a plurality of three-dimensional waveguides each being formed fully within an interior volume thereof by a corresponding plurality of three-dimensional waveguide channels. The three-dimensional waveguide channels are formed by wall portions each having a second index of refraction different from the first index of refraction.

14 Claims, 3 Drawing Sheets

APPARATUS AND METHOD FOR HYBRID OPTO-ELECTRICAL MULTICHIP MODULE

CROSS-REFERENCE TO RELATED APPLICATIONS

This application is a divisional of U.S. patent application Ser. No. 16/707,764 filed on Dec. 9, 2019, and presently allowed. The entire disclosure of the above application is incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to optical modules, and more particularly to a hybrid opto-electrical multi-chip module which involves waveguides implemented using through glass via technology, as well as optical wire bonding to create a high density, small form factor, opto-electrical multi-chip module for handling both optical and electrical signals.

BACKGROUND

The statements in this section merely provide background information related to the present disclosure and may not constitute prior art.

Current optical modules rely on planar technology to generate routing of optical signals into waveguides on a planar surface. The alignment of external components to these waveguides is complex and challenging, and represents an expensive task, due to the tight alignment requirements needed to mitigate optical signal loss. In addition, the form factor of such an assembly is relatively large due to the physical space needed for electrically and optically connecting both optical and electrical components.

Accordingly, there is a need in the art for an opto-electrical module having even higher interconnect density in an even smaller form factor.

SUMMARY

This section provides a general summary of the disclosure, and is not a comprehensive disclosure of its full scope or all of its features.

In one aspect the present disclosure relates to a monolithic waveguide substrate for enabling routing of at least one optical signal. The monolithic waveguide substrate comprises a monolithic engineered substrate having a uniform material composition throughout, with a first index of refraction, and with a plurality of three-dimensional waveguides each being formed fully within an interior volume thereof by a corresponding plurality of three-dimensional waveguide channels. The three-dimensional waveguide channels are formed by wall portions each having a second index of refraction different from the first index of refraction.

In another aspect the present disclosure relates to a monolithic waveguide substrate for enabling routing of at least one optical signal. The monolithic waveguide substrate comprises a monolithic engineered substrate having a uniform material composition throughout having a first index of refraction. The monolithic waveguide substrate further includes a plurality of three-dimensional waveguides each being formed fully within an interior volume thereof by a corresponding plurality of three-dimensional waveguide channels. The three-dimensional waveguide channels are formed by wall portions each having a second index of refraction different from the first index of refraction. A first subplurality of the three-dimensional waveguide channels each form an L-shape to form a non-straight path to enable communicating optical signals from a first surface portion of the monolithic engineered substrate to a second surface portion of the monolithic engineered substrate which is non-parallel to the first surface portion.

In still another aspect the present disclosure relates to a method for forming a monolithic waveguide substrate for enabling routing of at least one optical signal. The method may include providing a monolithic engineered substrate comprised of at least one of glass or silicon, and having a uniform material composition throughout with a first index of refraction. A laser is used to selectively remove material from the monolithic engineered substrate to form a plurality of independent, three-dimensional waveguide channels, each being formed fully within an interior volume of the monolithic engineered substrate. The laser is further used to change the refractive index of wall portions of the three-dimensional waveguide channels such that the wall portions have a second index of refraction different from the first index of refraction.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure provides a hybrid opto-electrical, multi-chip module apparatus having a highly compact form factor, relatively low manufacturing cost, and high-density component interconnect capability. At a high level, the present disclosure provides a hybrid, opto-electrical, multi-chip module which makes use of a multi-layer 3D waveguide substrate and optical wire bonds to provide an opto-electrical module in an extremely small form factor which can both receive and communicate optical signals out from the module to external components. The 3D waveguide substrate also provides an improved level of electrical interface capability to complement the multilayer waveguide architecture without interfering with, or unduly complicating, the optical waveguides and/or optical wire bonds used to transmit optical signals to and from the module.

Figure 1:
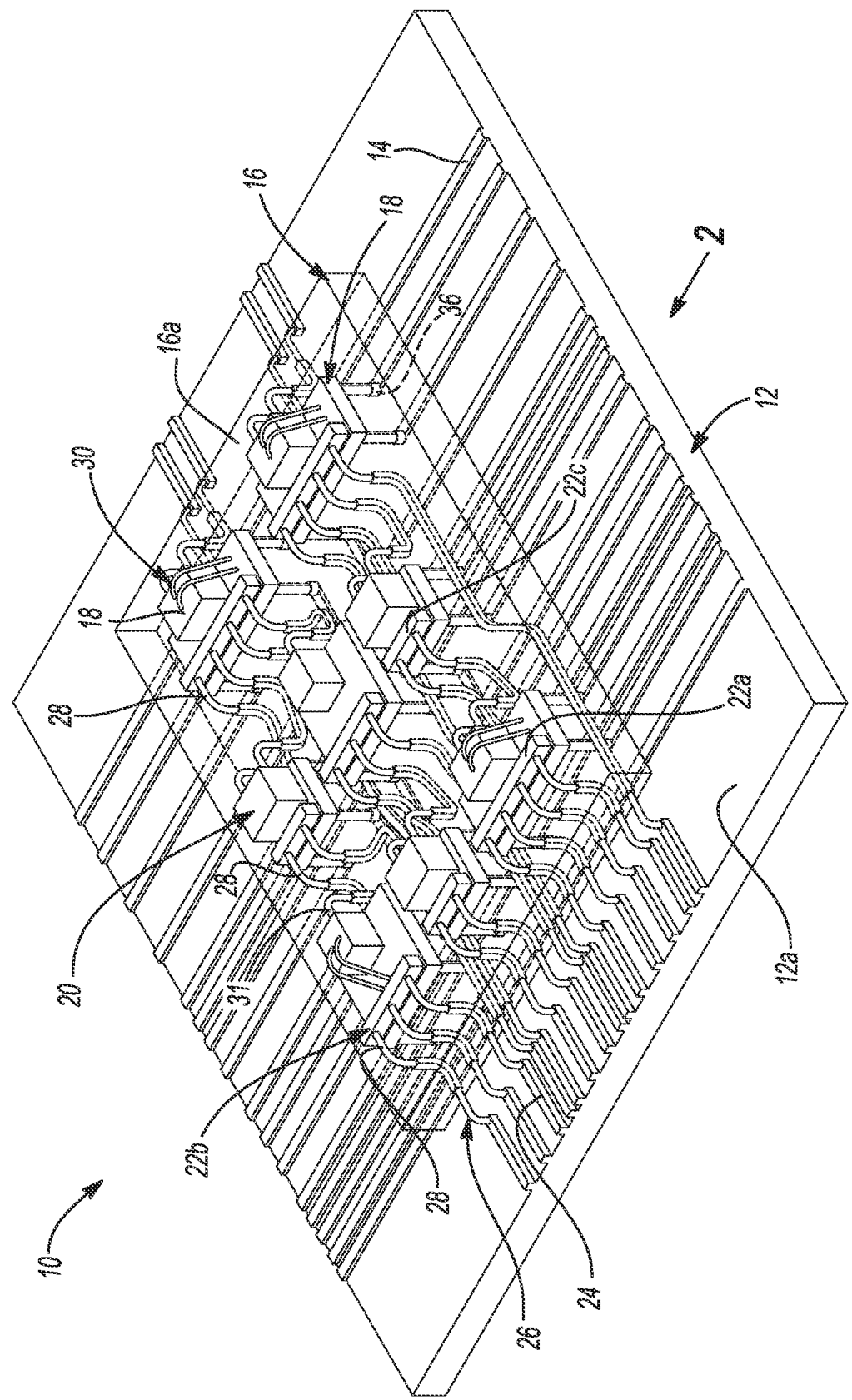
FIG. 1 is a perspective view of a hybrid opto-electrical module in a accordance with one embodiment of the present disclosure.

Referring to FIG. 1, a hybrid opto-electrical multi-chip module apparatus 10 (hereinafter simply "module 10") is shown in accordance with one embodiment of the present disclosure. The module 10 in this example includes a module substrate 12, which in one example may be a printed circuit board (PCB), a silicon substrate, a glass substrate, etc. For convenience and without limitation, the module substrate 12 will be referred to throughout the following discussion as "PCB" 12.

The PCB 12 may include one or more electrically conductive circuit traces 14 (for example, gold or copper traces) formed thereon or therein. The module 10 also includes a three dimensional (3D) "Through Glass Via" (TVG) glass waveguide substrate 16 (hereinafter simply "waveguide substrate" 16). The waveguide substrate 16 may be supported on or adjacent to the PCB 12, or even more preferably just above an upper surface 12a of the PCB 12.

The module 10 further includes one or more electronic components, which in this example are a plurality of application specific integrated circuits (ASICs) 18. The ASICs 18 are mounted on an upper surface 16a of the waveguide substrate 16. The attachment may be effected via a conventional die attachment process where the components are electrically connected either via flip-chip or wire bonding processes as with conventional die mounting. One or more transducers are also supported on the waveguide substrate 16. In this example the transducers include both one or more electro-optical transducers and one or more opto-electrical transducers. The electro-optical transducers in this example are vertical cavity surface emitting lasers (VCSELs) 20 which are each manufactured and mounted on an associated one of the ASICs 18, and thus form an integrated portion of its associated ASIC 18. Optionally, the VCSELs 20 could be mounted on the waveguide substrate 16, but mounting them directly on the ASICs 18 minimizes point to point wiring, and is therefore likely to be a preferred manufacturing approach, and particularly so for minimizing the form factor of the module 10.

The one or more opto-electrical transducers may include, for example, one or more photodetector modules 22a, 22b and 22c which may also be supported on associated ones of the ASICS 18, or optionally directly on the waveguide substrate 16. Photodetector modules 22a are illustrated as having four photodetectors (i.e., a four channel photodetector), while photodetector modules 22b are illustrated as having three photodetectors (i.e., a three channel photodetector), and photodetector modules 22c are illustrated as having two photodetectors (i.e., a two channel photodetector). However, the module 10 could incorporate other combinations of photodetector modules 22a, 22b 22c, with a total number of photodetector modules being greater or lesser than that shown in FIG. 1. Accordingly, the illustration of two, three and four channel photodetector modules is only meant to illustrate one specific example configuration for the module 10, and a wide variety of other configurations is also possible. Optionally, other types of opto-electrical transducers or components could be used, for example optical switches, multiplexers and/or demultiplexers.

The module 10 further includes a plurality of independent optical waveguide elements 24 and a corresponding plurality of optical wire bonds 26 for coupling the waveguide elements 24 to corresponding waveguides formed within the waveguide substrate 16. The optical waveguide elements 24 may be comprised of any suitable material or polymer, but in one preferred implementation are formed using ORMOCOMP® hybrid organic-inorganic polymer. Intense ultra short laser pulses are tightly focused inside transparent materials, which causes a non-linear absorption in the focal volume to take place, leading to optical breakdown and formation of microplasma, thus inducing permanent structural and refractive index modification within the polymer. An additional corresponding plurality of optical wire bonds 28 is used to couple the waveguides of the waveguide substrate 16 to inputs of the photodetector modules 22a, 22b and 22c. The optical wire bonds 26 readily accommodate minor misalignments between the waveguide elements 24 and the waveguides formed in the waveguide substrate 16, and the optical wire bonds 28 accommodate any misalignments between the waveguides in the waveguide substrate 16 and outputs of the photodetector modules 22a, 22b and 22c. The optical wirebonds 26 and 28 may be formed from any material which can transmit an optical signal, however ORMOCOMP® hybrid organic-inorganic polymer is especially well suited for this purpose, as it lends itself well to an additive manufacturing (i.e., 3D printing) process. The ORMOCOMP® polymer is also well suited for the optical wavelengths used with the components like the module 10.

Figure 2:
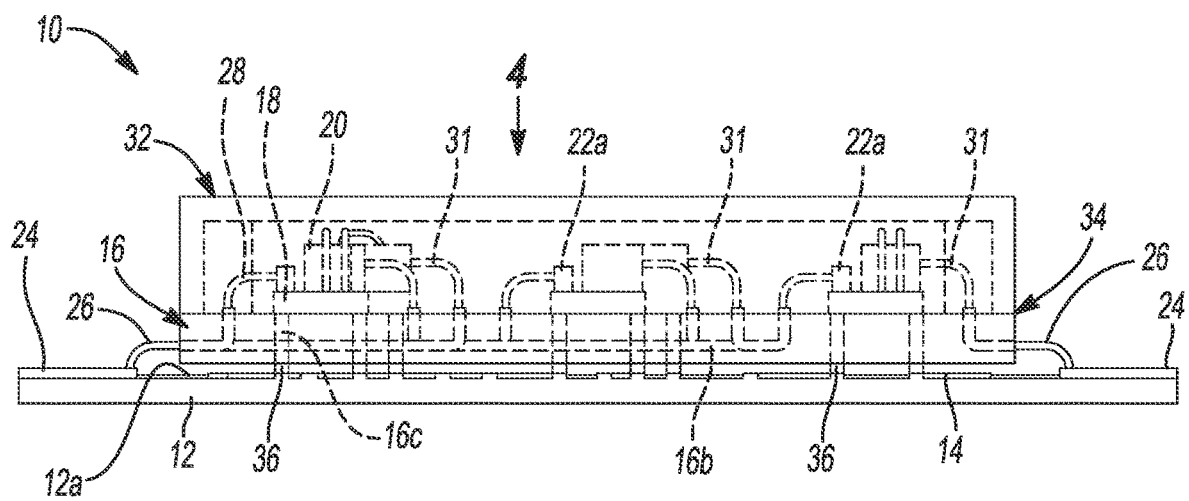
FIG. 2 is a side view of the module of Figure one taken in accordance with directional line 2 in FIG. 1.

FIGS. 1 and 2 also show a separate plurality of electrical wire bonds 30 which are used to couple select ones of the VCSELs 20 to their associated ASICs 18. The wire bonds 30 enable each of the VCSELs to be independently controlled by electrical signals generated by its associated ASIC 18, or possibly even by two or more of the ASICs. A separate plurality of optical wire bonds 31, preferably ORMOCOMP® hybrid organic-inorganic polymer wirebonds, may be used to couple the optical output from each VCSEL 20 into the waveguides formed inside the waveguide substrate 16. And while VCSELs 20 are shown, it will be appreciated that one or more other forms of lasers (e.g., Horizontal Cavity Surface Emitting Lasers (HCSELs)), or other type of electro-optical transducers, could potentially be used instead of a VCSEL, and the present module 10 is therefore not limited to use with only VCSELs.

Figure 2A:
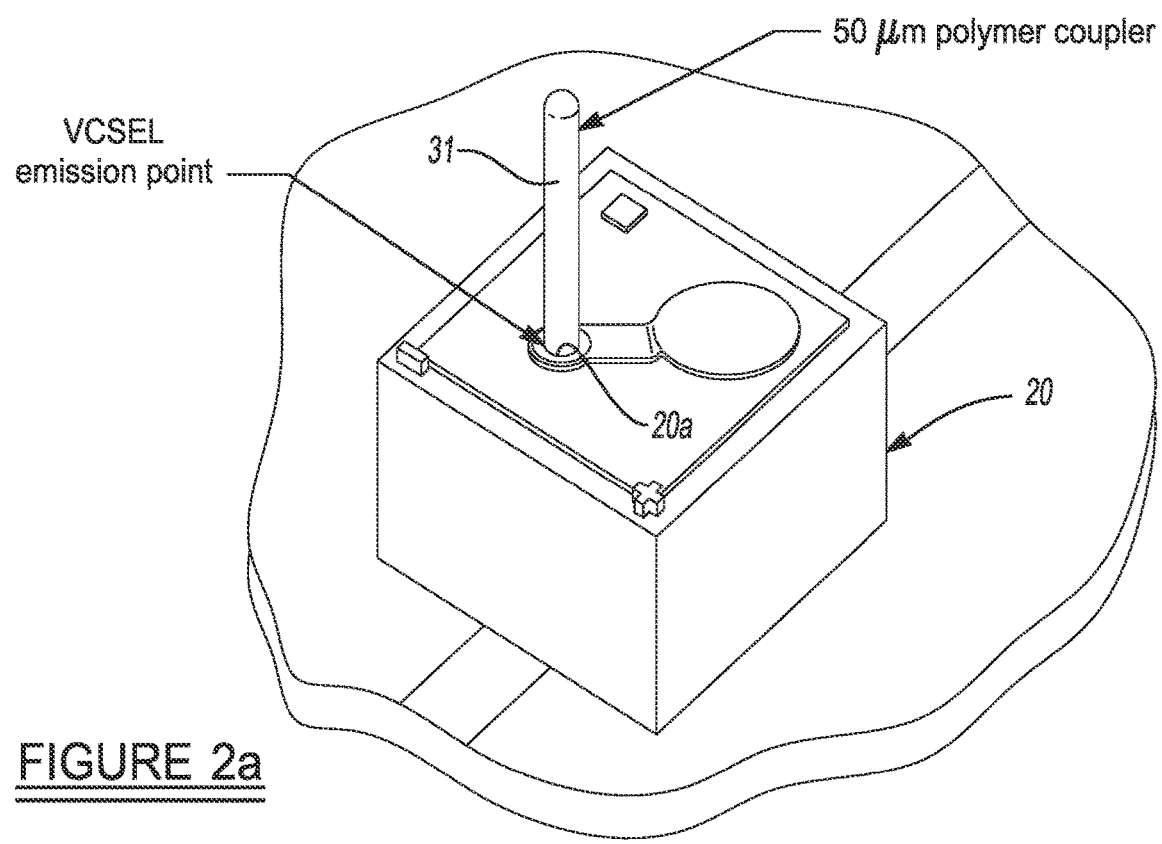
FIG. 2a is a highly enlarged perspective view of just one VCSEL with a portion of one optical wire bond formed over the output of the VCSEL.

FIG. 2a shows one highly enlarged illustration of how the optical wire bond 31 may be formed using ORMOCOMP® polymer to interface directly to an output 20a of one of the VCSELs 20 using an additive manufacturing operation and 3D printing the wire bond 31. These connections may be formed in-situ after the VCSELs 20 (or other form of edge emitting lasers) is/are attached to connect to the next waveguide or other optical element.

In operation, the photodetector modules 22a, 22b and 22c operate to receive optical signals input to the waveguide elements 24 from external optical sources, and to convert the received optical signals to corresponding electrical signals. The corresponding electrical signals are transmitted to the ASIC 18 associated with the photodetector module 22a, 22b or 22c. The ASIC 18 generates electrical signals which can be used to control the VCSELs 20, and/or which may also be transmitted over one or more of the circuit traces 14 to other remote electrical components. The VCSELs 20 may output optical signals back over the same waveguide elements 24 or possibly over different ones of the waveguide elements, or possibly even as inputs to one or more other ones of the photodetector modules 22a, 22b and/or 22c, depending on the design of the waveguide substrate 16. As such, it will be appreciated that certain of the waveguide elements 24 may thus be configured to function as both inputs and outputs.

With specific reference to FIG. 2, a side view of the module 10 is shown. The module 10 preferably includes a cover 32, in this example a hollowed out glass lid, secured to an upper surface 16a of the waveguide substrate 16. The attachment may be effected by any means that provides an excellent seal, but preferably one that forms a hermetic seal. In one example a seal at a perimeter area 34 where the edges of the cover 32 and the upper surface 16a of the waveguide substrate 16 meet is formed by a laser welded glass joint. Optionally, a suitable adhesive/sealant may be used to form the seal at the perimeter area 34 It is expected that hermetic bonding will be critical in many applications to protect optical elements such as laser diodes, as well as the optical wirebonds used, and possibly other components as well.

FIG. 2 also shows a plurality of internally formed, three dimensional (3D) waveguides 16b and a plurality of through vias 16c formed within the waveguide substrate 16. Electrically conductive standoffs 36 help to provide both physical support to space the waveguide substrate 16 slightly apart from the upper surface 12a of the PCB 12, as well as electrical connections between associated ones of the circuit traces 14 and the through vias 16c. The electrically conductive standoffs 36 may be formed by soldering or any other suitable means, and may be made from tungsten, gold, copper or from any other electrically conductive material that can be deposited to form electrical connection paths through select areas of the waveguide substrate 16.

Figure 3:
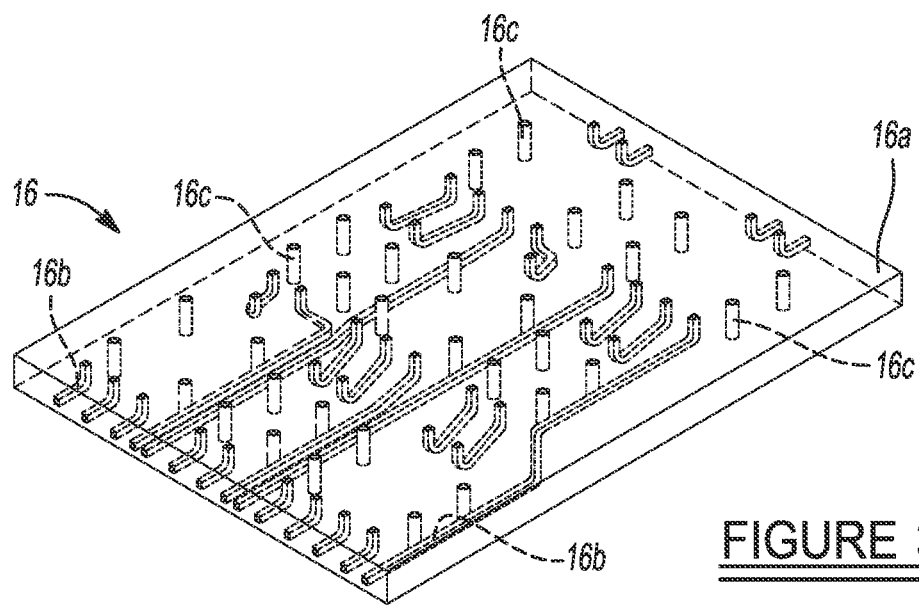
FIG. 3 is a perspective view of just the optical substrate of the module of FIG. 1.
Figure 4:
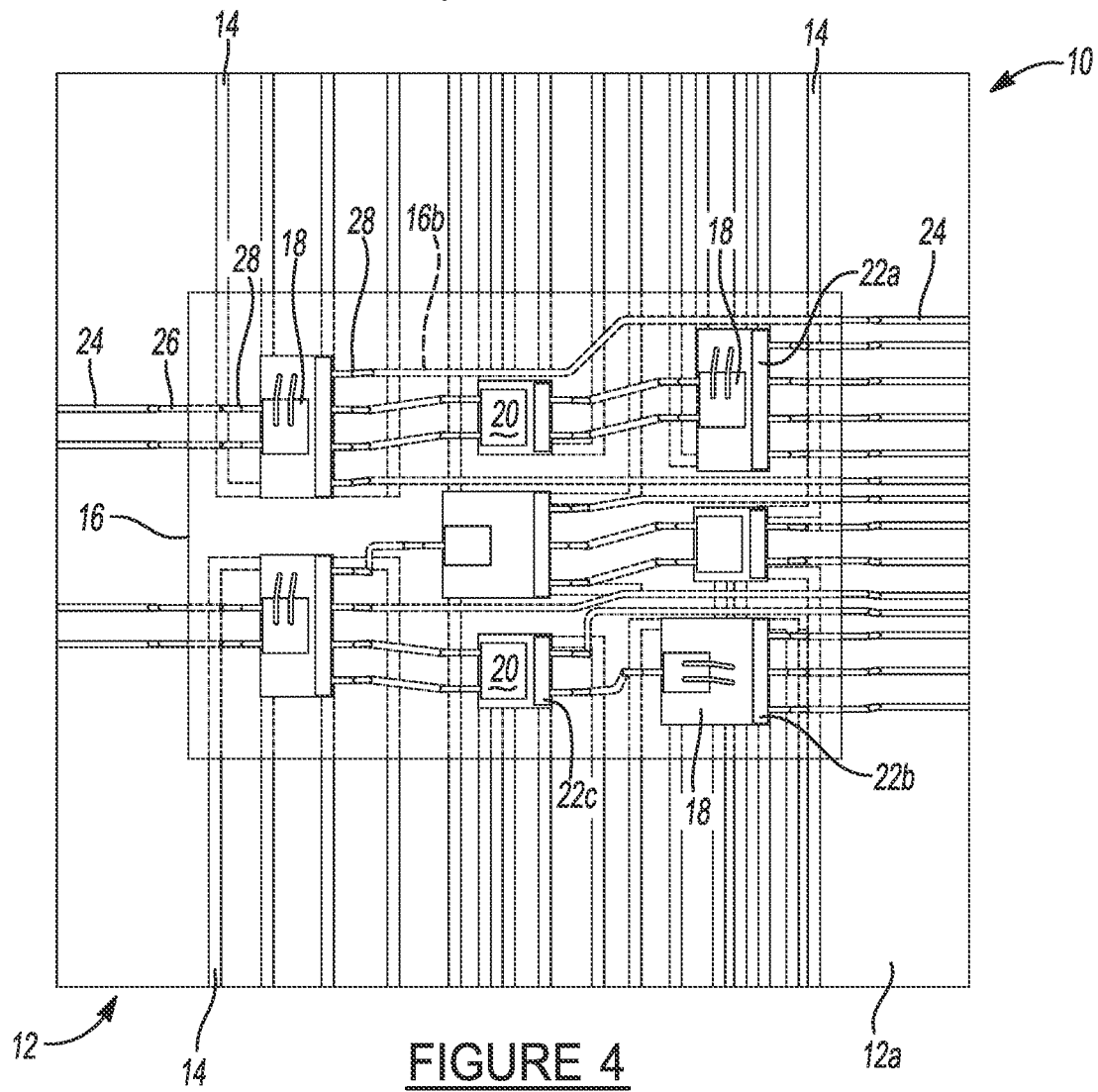
FIG. 4 is a plan view looking down onto an upper surface of the module of FIG. 1 in accordance with directional arrow 4 in FIG. 1.

With brief reference to FIG. 3 the waveguide substrate 16 can be seen without any other components secured thereto. The internally formed 3D waveguide channels 16b operate to channel optical signals to the photodetector modules 22a, 22b and 22c, and also to channel the optical output signals from the VCSELs 20 out to the PCB 12 mounted waveguide elements 24. One or more of the 3D waveguide channels 16b may also be configured to handle both incoming optical signals and out-going optical signals, depending on the specific design of the waveguide substrate 16. One or more of the waveguide elements 24 may be coupled to external, remote components, for example a corresponding plurality of photodetectors associated with a remote electronic subsystem communicating with the module 10, or one or more remote optical signal sources that are supplying optical signals as inputs to the module 10. The waveguide substrate 16 in one preferred implementation is formed from a single, monolithic planar piece of glass. Other suitable materials may be BOROFLOAT® glass, fused silica or BK7 and its equivalent. Currently known manufacturing techniques involving use of a femtosecond laser may be used to pattern the 3D waveguides 16b by controlling the depth of penetration into the glass block substrate as the laser beam is moved in desired paths. The ultra short laser pulses create a microplasma confined to the focal plane within the material, which creates a change in the refractive index of the material, and thus enables the formation of the 3D waveguide channels within the volume of the waveguide substrate 16. As such, the depth control of the laser beam, in connection with the X-Y position of the laser beam, can thus create 3D waveguides within the glass block that are non-straight (e.g., which have curves, turns, etc.), and thus which extend in three dimensions within the glass block. Holes can then be formed in the glass block (or alternatively the holes can be formed before forming the 3D waveguides 16b with the femtosecond laser), and then the holes may be filled with the desired conductive metallic material (e.g., tungsten, gold, copper, etc.) in a molten state to create the finished through vias 16c.

With further reference to FIG. 3, the waveguide substrate 16 can be seen in isolation. The through vias 16c are arranged to extend perpendicularly through the full thickness of the waveguide substrate 16 without interfering with any of the 3D waveguides 16b. And while the through vias 16c are illustrated as extending perpendicularly through the thickness of the waveguide substrate 16, they need not necessarily be formed to extend perfectly perpendicularly and/or they need not be formed as perfectly straight through vias. The through vias 16c enable electrical connections with the circuit traces 14 without interfering with the optical paths formed by the 3D waveguides 16b. Including the through vias 16c inside the waveguide substrate 16 further helps to minimize the form factor of the module 10.

The waveguide substrate 16 thus provides the unique ability to channel electrical signals between PCB 12 mounted components and the circuit traces 14, as well as to provide 3D waveguides for channeling optical signals between the module 10 and other remote components. The ability to route two distinct types of signals through the waveguide substrate 16 (i.e., electrical and optical) helps significantly to make the overall module 10 particularly compact and easy to construct. The waveguide substrate 16 also helps to provide a modular feature to the module 10 because changes to any of the electronic components can potentially be made by substituting a new waveguide structure having a different collection of electronic components, without necessarily requiring modification of the PCB 12.

The circuit traces 14 may be used to receive electrical signals from other components, for example probes implanted in human or animal tissue, where the probes have one or more microelectrodes which receive electrical signals from the tissue. The circuit traces 14 may also be used to supply electrical signals generated by the ASICs out to external remote electrical/electronic components, or event to remote probes implanted in human or animal tissue. Electrical signals being input [TO] to the module 10 may be received by the ASICs 18 and converted to associated electrical signals for driving the VCSELS 20 and/or helping to control the photodetector modules 22a, 22b and 22c. The photodetector modules 22a, 22b and 22c each may convert received optical signals into electrical signals which are routed to its associated ASIC 18, and or to one or more of the other ASICs, or transmitted out from the module 10 over the circuit traces 14.

The module 10 thus forms a powerful, high density opto-electrical module that can interface with a large plurality of external optical or electrical/electronic components. The small form factor of the module 10 also makes it ideally suited for implantation into humans and animals for biomedical applications. The module as shown in FIGS. 1 and 2 may have dimensions of 5 mm×5 mm×5 mm thick, or even smaller. The use of the independently constructed waveguide substrate 16 further adds a degree of modularity to the construction of the module 10, which can enhance the ease with which later modifications or improvements (e.g., different or updated electrical/electronic or optical components) can be implemented in the module.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A monolithic waveguide substrate for enabling routing of at least one optical signal, the monolithic waveguide substrate comprising:
   a photodetector module;
   a planar, sheet-like monolithic engineered substrate having a uniform material composition throughout, a major planar surface bounded by a plurality of lateral edge surfaces, and further having a first index of refraction, and with a plurality of three-dimensional waveguides each being fully formed and contained within an interior volume thereof by a corresponding plurality of three-dimensional waveguide channels, the photodetector module being supported on the planar, sheet-like monolithic engineered substrate;
   the plurality of three-dimensional waveguide channels each being formed fully integrally within, and from, an interior volume of the monolithic engineered substrate by portions of the monolithic engineered substrate having a second index of refraction different from the first index of refraction, and at least a first one of the plurality of three-dimensional waveguide channels having a U-shape and extending continuously without interruption from a first location on the major planar surface of the monolithic engineered substrate, forming a first opening on the major planar surface, through the interior volume of the monolithic engineered substrate to a second location on the major planar surface of the monolithic engineered substrate, and forming a second opening on the major planar surface, such that each one of said plurality of three-dimensional waveguide channels forms a non-straight path through the monolithic engineered substrate while each forming a continuous, uninterrupted waveguide channel using the second index of refraction from the first location to the second location along a curved path to enable the optical signal to be routed into the first opening and received at the second opening;
   at least one optical wirebond projecting outwardly of the major planar surface and in direct communication with one of the three-dimensional waveguide channels for communicating an optical signal to the photodetector.

2. The monolithic waveguide substrate of claim 1, further including a plurality of electrically conductive through vias extending through at least a portion of the monolithic engineered substrate and providing independent electrical communication paths through the monolithic engineered substrate.

3. The monolithic waveguide substrate of claim 2, wherein at least a subplurality of the plurality of electrically conductive through vias extend through a full thickness of the monolithic engineered substrate.

4. The monolithic waveguide substrate of claim 2, wherein at least one of the plurality of electrically conductive through vias comprises a straight length through via.

5. The monolithic waveguide substrate of claim 2, wherein the plurality of electrically conductive through vias are comprised of tungsten.

6. The monolithic waveguide substrate of claim 2, wherein the plurality of electrically conductive through vias are comprised of gold.

7. The monolithic waveguide substrate of claim 2, wherein at least one of the electrically conductive through vias are comprised of copper.

8. The monolithic waveguide substrate of claim 1, wherein the monolithic engineered substrate comprises a monolithic engineered silicon substrate.

9. The monolithic waveguide substrate of claim 1, wherein the monolithic engineered substrate comprises a monolithic engineered glass substrate.

10. The monolithic waveguide substrate of claim 1, wherein at least a second one of the three-dimensional waveguide channels comprises a 90 degree bend.

11. The monolithic waveguide substrate of claim 10, wherein opposing ends of the at least second one of the three-dimensional waveguide channels communicates with first and second perpendicular edge surfaces of the monolithic engineered substrate.

12. The monolithic waveguide substrate of claim 1, further comprising a printed circuit board disposed against the monolithic engineered substrate.

13. The monolithic waveguide substrate of claim 12, further comprising an electrical circuit trace on the printed circuit board for communicating electrical signals at least between an external electrical component and at least one of the plurality of electrically conductive through vias.

14. A method for forming a monolithic waveguide substrate for enabling routing of at least one optical signal, the method comprising:
   providing a planar, sheet-like, monolithic engineered substrate having a major planar surface bounded by a plurality of edge surfaces, and further comprised of at least one of glass or silicon, and having a uniform material composition throughout with a first index of refraction;
   using a laser to selectively heat regions within the monolithic engineered substrate sufficiently to change a refractive index of the monolithic engineered substrate at the heated regions to form at least one integral, U-shaped, three-dimensional waveguide channel, the at least one integral, U-shaped, three-dimensional waveguide channel being formed fully and integrally within, and from, an interior volume of the monolithic engineered substrate, the at least one U-shaped, three dimensional waveguide channel having a second index of refraction different from the first index of refraction, and having opposing ends that open to and communicate with first and second spaced apart surface area portions of the major planar surface of the monolithic engineered substrate, where the first spaced apart surface area portion forms a first opening on the major planar surface and the second spaced apart surface area portion forms a second opening on the major planar surface, and where the U-shaped three-dimensional waveguide channel forms a continuous, uninterrupted waveguide channel using the second index of refraction between the first and second openings of the first and second spaced apart surface area portions, respectively;
   securing a photodetector to the major planar surface; and
   securing an optical wirebond to the major planar surface such that the optical wirebond projects outwardly from the major planar surface and communicates directly with at least one of the first and second openings of the at least one U-shaped, three dimensional waveguide channel, and with the photodetector.

\* \* \* \* \*